(12) United States Patent
Kamiya (10) Patent No.: US 11,279,207 B2
(45) Date of Patent: Mar. 22, 2022

(54) BLOWER UNIT, AND METHOD OF MANUFACTURING BLOWER UNIT

(71) Applicant: DENSO CORPORATION, Kariya (JP)

(72) Inventor: Tomohiro Kamiya, Kariya (JP)

(73) Assignee: DENSO CORPORATION, Kariya (JP)

( * ) Notice: Subject to any disclaimer, the term of this patent is extended or adjusted under 35 U.S.C. 154(b) by 182 days.

(21) Appl. No.: 16/200,701

(22) Filed: Nov. 27, 2018

(65) Prior Publication Data

US 2019/0092128 A1 Mar. 28, 2019

Related U.S. Application Data

(63) Continuation of application No. PCT/JP2017/015852, filed on Apr. 20, 2017.

(30) Foreign Application Priority Data

May 30, 2016 (JP) .............................. JP2016-107666

(51) Int. Cl.
| | |
|---|---|
| *B60H 1/26* | (2006.01) |
| *B60H 1/32* | (2006.01) |
| *F04D 17/12* | (2006.01) |
| *F04D 29/42* | (2006.01) |
| *F04D 29/60* | (2006.01) |
| *F04D 29/62* | (2006.01) |

(Continued)

(52) U.S. Cl.
CPC ............ *B60H 1/32* (2013.01); *B60H 1/00471* (2013.01); *B60H 1/26* (2013.01); *F04D 13/06* (2013.01); *F04D 17/12* (2013.01); *F04D 29/42* (2013.01); *F04D 29/4246* (2013.01); *F04D 29/60* (2013.01); *F04D 29/62* (2013.01)

(58) Field of Classification Search
CPC ........ B60H 1/32; B60H 1/00471; B60H 1/26; F04D 13/06; F04D 29/42; F04D 29/4246; F04D 29/60; F04D 29/62
USPC .................................. 454/163, 160; 415/101
See application file for complete search history.

(56) References Cited

U.S. PATENT DOCUMENTS

| | | | |
|---|---|---|---|
| 7,682,233 B2 * | 3/2010 | Wang | F04D 27/005 454/160 |
| 9,643,472 B2 * | 5/2017 | Sakamoto | B60H 1/00028 |

(Continued)

FOREIGN PATENT DOCUMENTS

WO WO-2012144153 A1 10/2012

*Primary Examiner* — Edelmira Bosques
*Assistant Examiner* — Ryan L Faulkner
(74) *Attorney, Agent, or Firm* — Harness, Dickey & Pierce, P.L.C.

(57) ABSTRACT

In a method of manufacturing a blower unit including an electric motor, a blower casing, first and second scroll casings, a sealing material that forms a seal between an opening forming portion of the blower casing and the electric motor, a bell mouth portion that guides an air flow to the second centrifugal fan, and a retaining portion that retains the sealing material, the method includes interposing the sealing material between the retaining portion and the electric motor, and attaching the bell mouth portion and the retaining portion to the electric motor, connecting the first and second centrifugal fans to the rotating shaft of the electric motor while the bell mouth portion and the retaining portion are attached to the electric motor, and closing the second opening portion of the blower casing by attaching the electric motor to the blower casing.

10 Claims, 8 Drawing Sheets

(51) Int. Cl.
*B60H 1/00* (2006.01)
*F04D 13/06* (2006.01)

(56) References Cited

U.S. PATENT DOCUMENTS

| 2012/0207593 | A1* | 8/2012 | Ochiai | F04D 29/424 |
| | | | | 415/204 |
| 2014/0045417 | A1 | 2/2014 | Sakamoto et al. | |
| 2015/0167688 | A1* | 6/2015 | Jang | H02K 5/04 |
| | | | | 384/438 |

* cited by examiner

BLOWER UNIT, AND METHOD OF MANUFACTURING BLOWER UNIT

CROSS REFERENCE TO RELATED APPLICATIONS

The present application is a continuation application of International Patent Application No. PCT/JP2017/015852 filed on Apr. 20, 2017, which designated the U.S. and claims the benefit of priority from Japanese Patent Application No. 2016-107666 filed on May 30, 2016. The entire disclosures of all of the above applications are incorporated herein by reference.

TECHNICAL FIELD

The present disclosure relates to a blower unit and a method of manufacturing a blower unit.

BACKGROUND

Blower units for vehicle air conditioners are known. In some cases, rainwater may enter a blower casing of such a blower unit from outside of the vehicle. It is desirable to prevent such rainwater from passing through the blower casing and leaking into a passenger compartment.

SUMMARY

According to one aspect of the present disclosure, a blower unit for a vehicle air conditioner may include a blower casing, one of more centrifugal fans housed within respective scroll casings, and an electric motor. An opening portion of the blower casing is closed by an electric motor. A sealing material is disposed between the blower casing and the electric motor.

DESCRIPTION OF EMBODIMENTS

Figure 1:
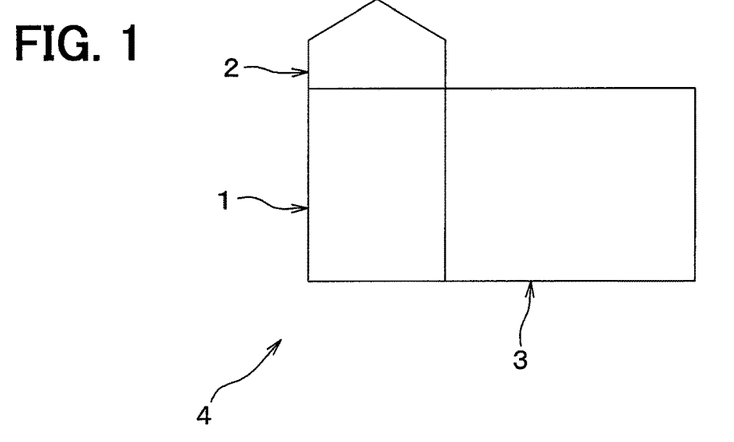
FIG. 1 is a diagram showing the entirety of a vehicle air conditioner according to an embodiment.
Figure 2:
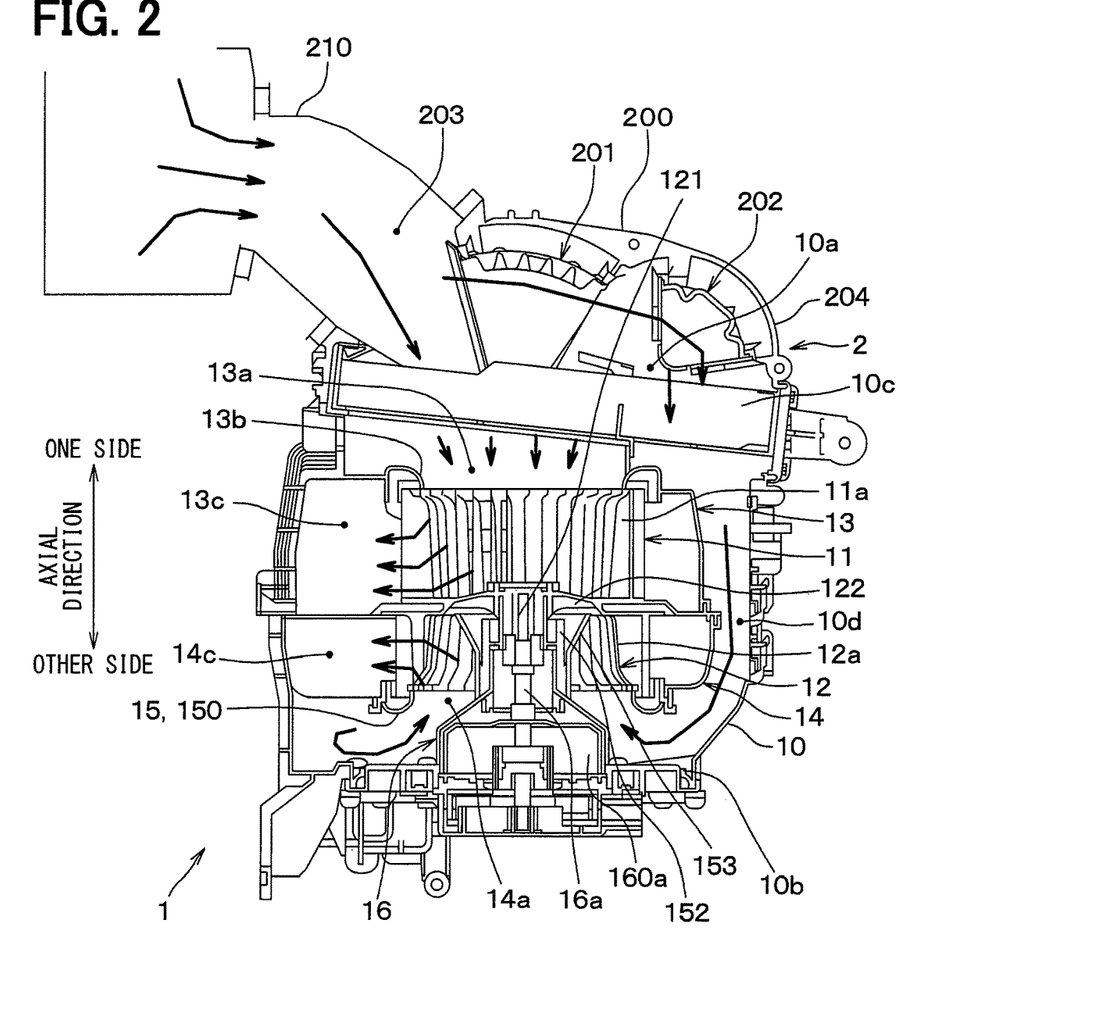
FIG. 2 is a cross-sectional view of a blower unit of FIG. 1.
Figure 3:
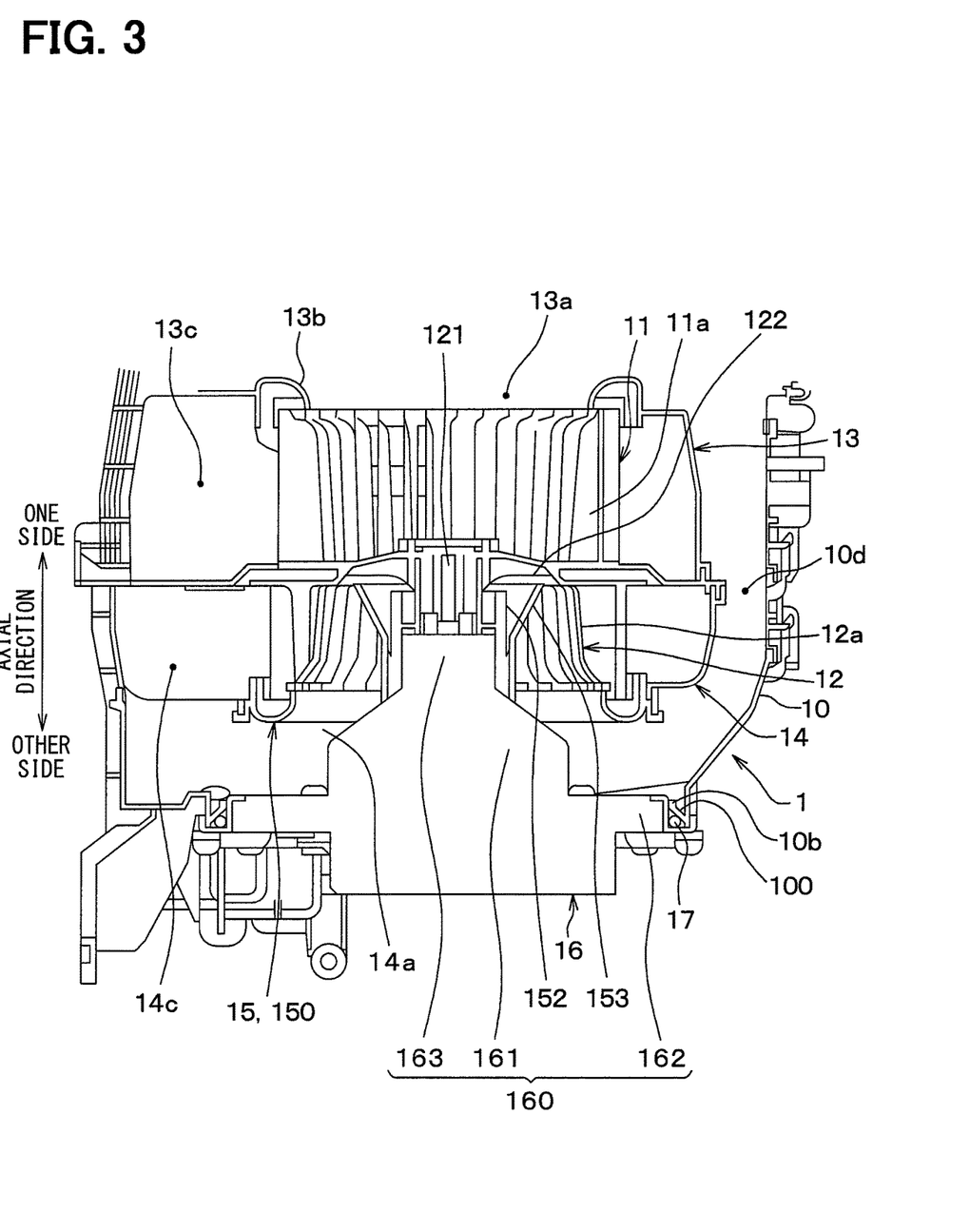
FIG. 3 is a partial enlarged view of a blower unit in FIG. 1.

Hereinafter, a blower unit according to an embodiment of the present disclosure will be described based on FIG. 1, FIG. 2, FIG. 3, etc.

A blower unit 1 of the present embodiment forms a vehicle air conditioner 4 together with an inside/outside air switching box 2 and an inside air conditioning unit 3.

The blower unit 1 is an air blowing unit which sucks in an airflow introduced from the inside/outside air switching box 2 and blows an airflow in two layers to the inside air conditioning unit 3. The inside air conditioning unit 3 adjusts the temperature of the two layer airflow blown out from the blower unit 1 with a cooling heat exchanger, a heating heat exchanger, an air mixing door, etc., and blows out the two layer airflow into a passenger compartment. The inside/outside air switching box 2 introduces at least one of passenger compartment air (hereinafter referred to as "inside air") and outside air (hereinafter referred to as "outside air") to the blower unit 1.

Next, the structure of the blower unit 1 and the inside/outside air switching box 2 of the present embodiment will be described with reference to FIGS. 2, 3, etc.

The blower unit 1 includes a blower casing 10, centrifugal fans 11, 12, scroll casings 13, 14, a bell mouth module 15, an electric motor 16, and a sealing material 17.

The blower casing 10 is formed with an opening portion 10a which opens toward one side in the axial direction. The axial direction is the direction in which an axial line of a rotating shaft 16a of the electric motor 16 extends. The opening portion 10a forms an air suction port into which the airflow blown from the inside/outside air switching box 2 flows. A filter 10c for removing impurities from the air blown from the inside/outside air switching box 2 is provided on the opening portion 10a side of the blower casing 10. The opening portion 10a corresponds to a first opening portion.

The blower casing 10 is formed with an opening portion 10b which opens toward the other side in the axial direction. The opening portion 10b is closed by the electric motor 16. The opening portion 10b corresponds to a second opening portion.

The centrifugal fan 11 is a sirocco fan including a plurality of blades 11a aligned along a circumferential direction about an axis line. The centrifugal fan 11 sucks air from one side in the axial direction and blows it outward in the radial direction. In this specification, the radial direction refers to the radial direction about the axial line of the rotating shaft 16a of the electric motor 16. The centrifugal fan 11 corresponds to a first centrifugal fan.

The centrifugal fan 12 is a sirocco fan including a plurality of blades 12a aligned along a circumferential direction about an axis line. The centrifugal fan 12 is provided toward the other side in the axial direction with respect to the centrifugal fan 11. The centrifugal fan 12 sucks air from the other side in the axial direction and blows it outward in the radial direction. The centrifugal fan 12 corresponds to a second centrifugal fan.

The centrifugal fans 11, 12 of the present embodiment are integrally formed from a resin material or the like. A boss portion 121 of the centrifugal fans 11, 12 is connected to the rotation shaft 16a of the electric motor 16 in the motor housing 160.

The scroll casing 13 is disposed toward one side in the axial direction inside the blower casing 10. The scroll casing 13 accommodates the centrifugal fan 11 and forms an air intake port 13a which opens toward one side in the axial direction. The scroll casing 13 corresponds to a first scroll casing. The air intake port 13a corresponds to a first air intake port.

A forming portion 13b of the scroll casing 13 forms the air intake port 13a. The forming portion 13b forms a bell mouth portion that rectifies an airflow that flows from the opening portion 10a of the blower casing 10 to the air intake port 13a. The outer diameter dimension of the centrifugal fan 11 is larger than the inner diameter dimension of the opening portion of this bell mouth portion. The air intake port 13a is formed such that the diameter dimension of the air intake port 13a gradually increases toward one side in the axial direction.

An air passage 13c in the scroll casing 13 is provided radially outward of the centrifugal fan 11. The air passage 13c collects the air blown from the centrifugal fan 11 and blows out the air to the inside air conditioning unit 3.

The scroll casing 14 is disposed toward the other side in the axial direction inside the blower casing 10. The scroll casing 14 accommodates the centrifugal fan 12 and forms an air intake port 14a which opens toward the other side in the axial direction. An air passage 14c in the scroll casing 14 is provided radially outward of the centrifugal fan 12. The air passage 14c collects the air blown from the centrifugal fan 12 and blows out the air to the inside air conditioning unit 3. The scroll casing 14 corresponds to a second scroll casing. The air intake port 14a corresponds to a second air intake port.

Figure 4:
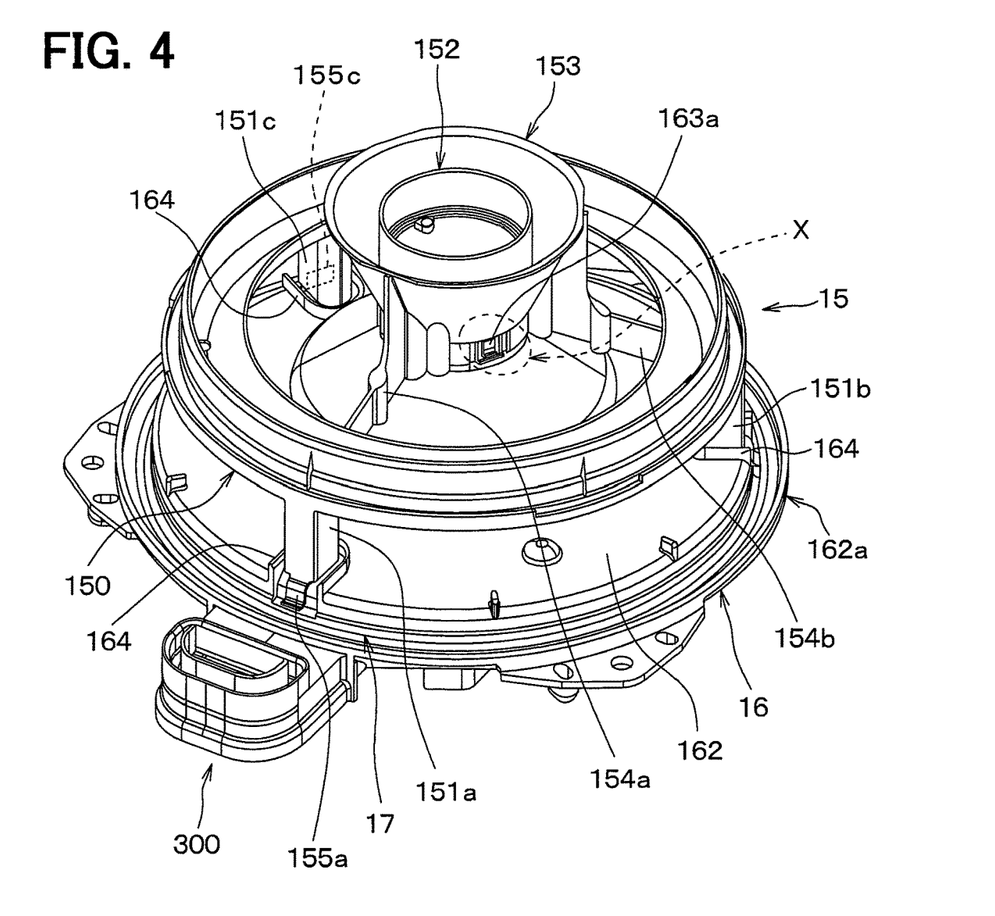
FIG. 4 is a perspective view showing an electric motor and a bell mouth module in FIG. 1.

The bell mouth module 15 includes a bell mouth portion 150, leg portions 151a to 151c, an inner cylindrical portion 152, a conical portion 153, and support portions 154a, 154b, 154c.

The bell mouth portion 150 is formed annularly about the axial line so as to surround the air intake port 14a. The bell mouth portion 150 is arranged toward the other side in the axial direction with respect to the air intake port 14a of the scroll casing 14. The bell mouth portion 150 is formed such that the diameter dimension of the air intake port 14a gradually increases toward the other side in the axial direction. The bell mouth portion 150 rectifies the airflow flowing from the opening portion 10a of the blower casing 10 through the air flow path 10d to the air intake port 14a. The outer diameter dimension of the centrifugal fan 12 is larger than the inner diameter dimension of the opening portion of the bell mouth portion 150.

The leg portions 151a, 151b, 151c are formed so as to protrude from the bell mouth portion 150 toward the other side in the axial direction. The leg portions 151a, 151b, 151c are arranged along the circumferential direction about the axial line.

A claw portion 155a is provided on the distal end side of the leg portion 151a of the present embodiment. The claw portion 155a is formed so as to protrude from the distal end side of the leg portion 151a along a flange 162 of the electric motor 16 toward a bottom portion 162b side of a recessed portion 162a.

Claw portions 155b, 155c are provided on the distal end sides of the leg portions 151b, 151c, respectively. The claw portions 155b and 155c are formed so as to protrude from the distal end sides of the leg portions 151b and 151c along the flange 162 of the electric motor 16 toward the bottom portion 162b side of the recessed portion 162a.

The claw portions 155a, 155b, 155c retain the sealing material 17 between the bottom portion 162b of the recessed portion 162a of the flange 162 of the electric motor 16.

Figure 7:
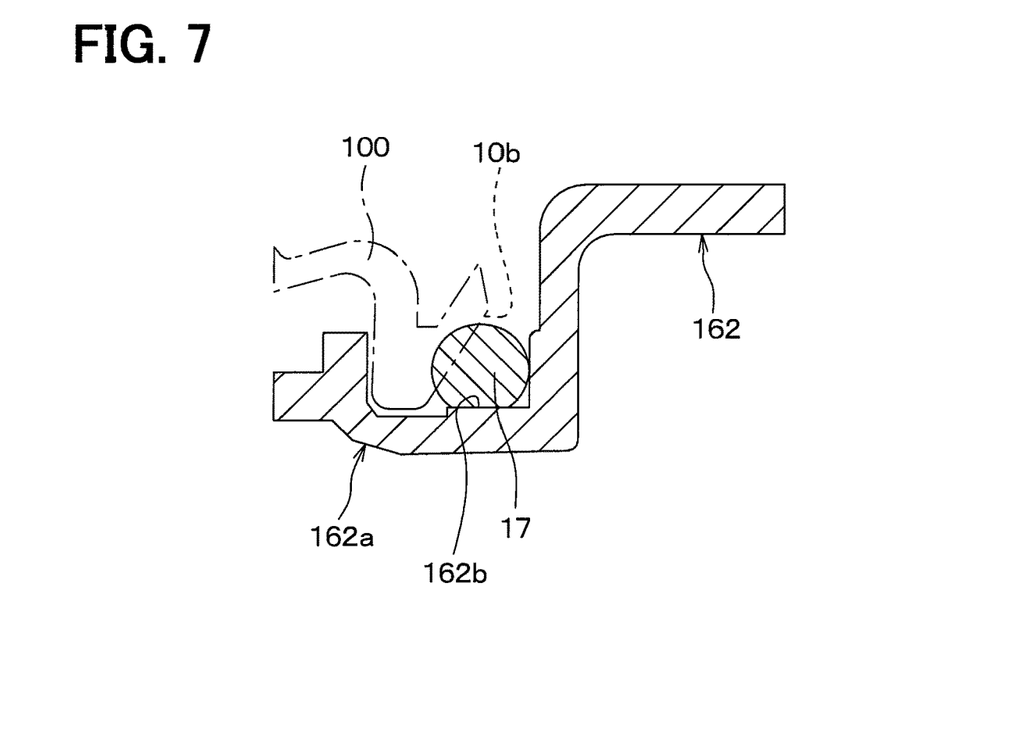
FIG. 7 is a sectional view taken along line VII-VII in FIG. 6.
Figure 8:
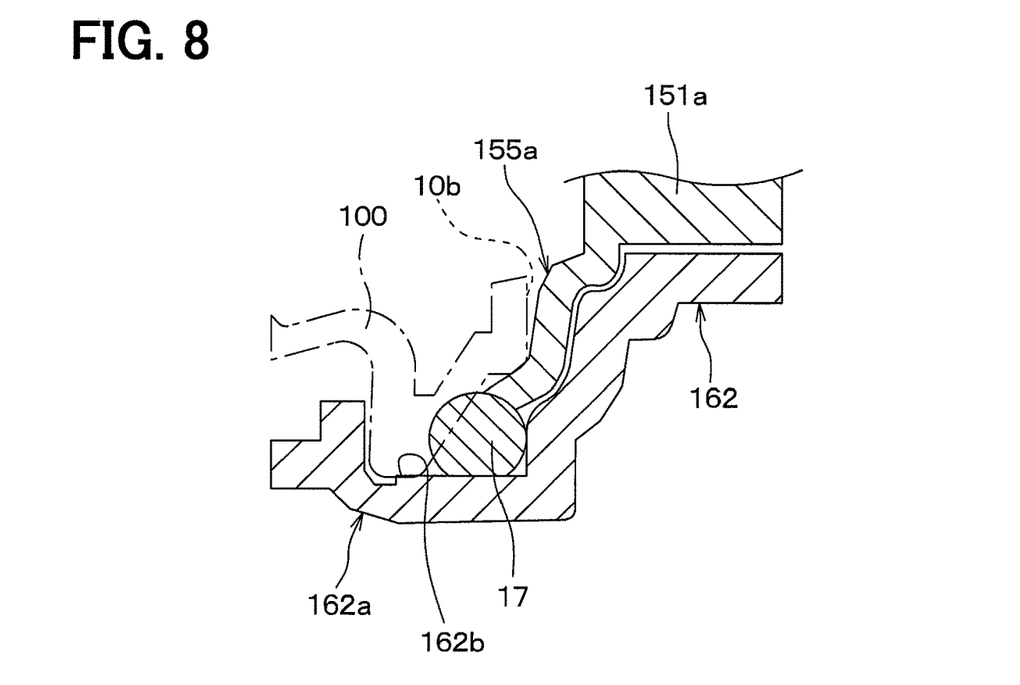
FIG. 8 is a sectional view taken along line VIII-VIII in FIG. 6; FIG.

As shown in FIGS. 7 and 8, the claw portion 155a is disposed between an opening forming portion 100 of the blower casing 10 and the recessed portion 162a of the flange 162. Similarly, the claw portions 155b, 155c are disposed between the opening forming portion 100 of the blower casing 10 and the recessed portion 162a of the flange 162.

The leg portion 151a and the claw portion 155a of the present embodiment constitute a fixing portion for retaining the sealing material 17. The leg portion 151b and the claw portion 155b constitute a fixing portion for retaining the sealing material 17. The leg portion 151c and the claw portion 155c constitute a fixing portion for retaining the sealing material 17. The leg portions 151a, 151b, 151c and the claw portions 155a, 155b, 155c correspond to a retaining portion.

Here, the leg portion 151a and the claw portion 155a are disposed so as to not be in contact with the motor housing 160 of the electric motor 16. The leg portion 151b and the claw portion 155b are disposed so as to not be in contact with the motor housing 160 of the electric motor 16. The leg portion 151c and the claw portion 155c are disposed so as to not be in contact with the motor housing 160 of the electric motor 16.

Figure 6:
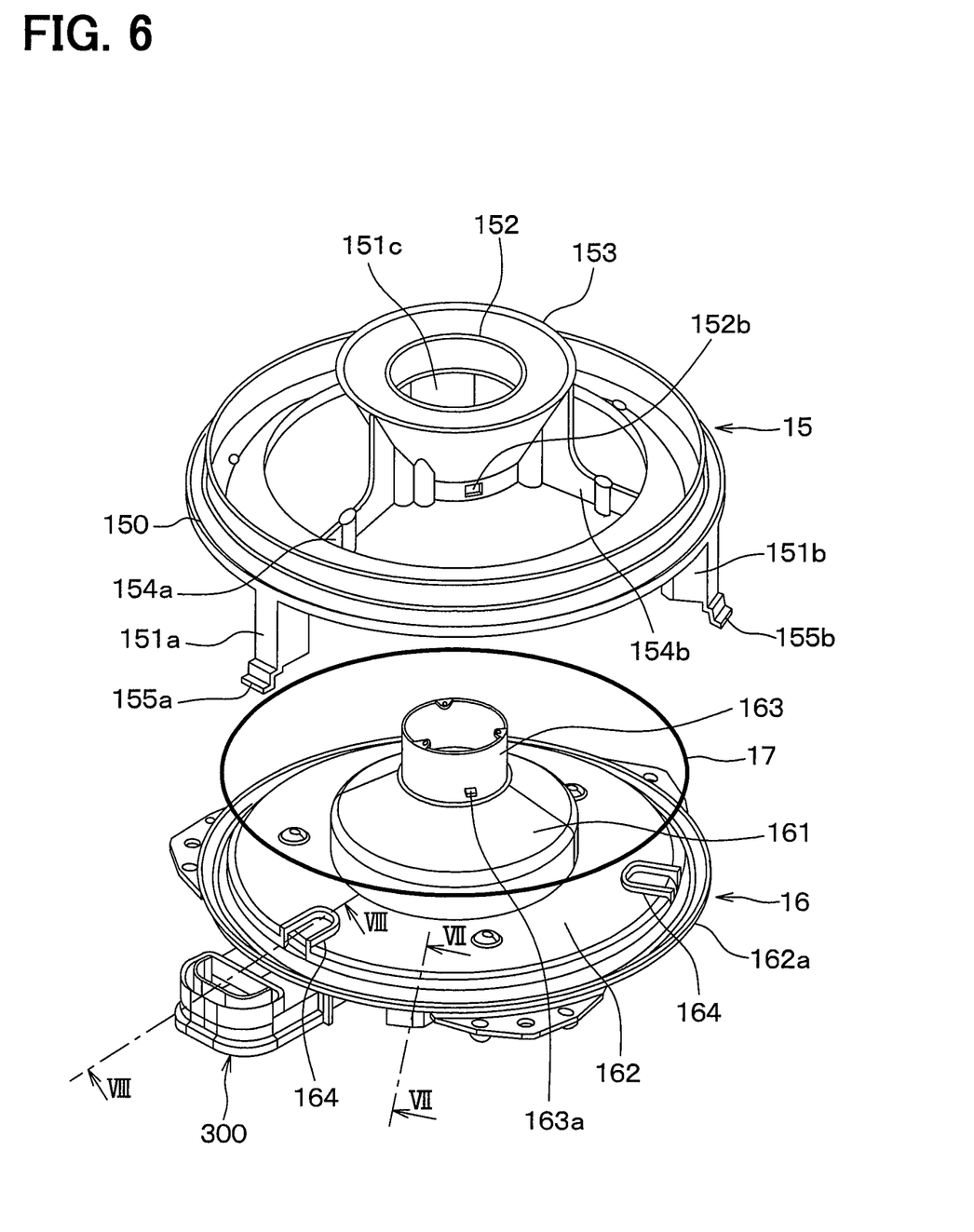
FIG. 6 is an exploded view showing an electric motor, a bell mouth module, and a sealing material in FIG. 5.

The inner cylindrical portion 152 is formed in a cylindrical shape that surrounds an annular protrusion portion 163 of the motor housing 160 from the radially outer side. The inner cylindrical portion 152 forms a supported portion that is fitted with the annular protrusion portion 163 of the motor housing 160 and is supported by the motor housing 160 of the electric motor.

Figure 5:
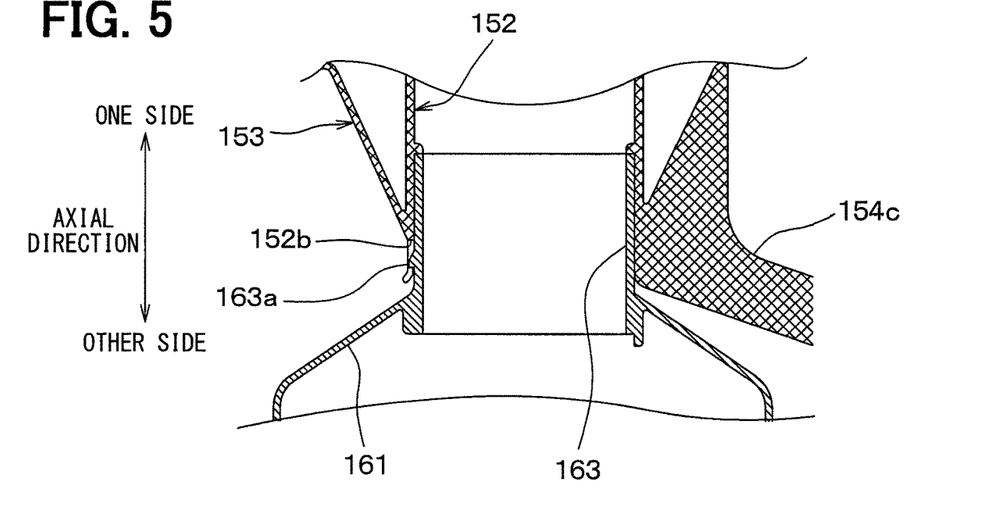
FIG. 5 is a partial cross-sectional view showing an X portion in FIG. 4.

The conical portion 153 surrounds a portion of the inner cylindrical portion 152 toward the other side in the axial direction from the radially outer side, and is formed in a conical shape with a diameter dimension centered on the axial line that increases toward the one side in the axial direction. The conical portion 153 faces a main plate 122 of the centrifugal fans 11, 12 with a space between the conical portion 153 and the main plate 122. As shown in FIG. 5, a throughhole 152b penetrating in the radial direction is provided on the other side of the inner cylindrical portion 152 in the axial direction.

Support portions 154a, 154b, 154c serve to improve rigidity by connecting the inner cylindrical portion 152 and the conical portion 153 to the leg portions 151a to 151c.

The electric motor 16 includes the motor housing 160 and a motor main body 160a. The motor housing 160 houses the motor main body 160a. The motor main body 160a is composed of a rotor, a stator, etc., and is disposed within the annular protrusion portion 163 of the motor housing 160.

The motor housing 160 includes a housing main body 161, the flange 162, and the annular protrusion portion 163. The housing main body 161 is formed in a cylindrical shape about the axial line as the center. The flange 162 is formed in an annular shape surrounding the portion of the housing main body 161 toward the other end of the axial direction from the radially outer side.

On the radially outer side of the flange 162 of the present embodiment, a recessed portion 162a is provided. The recessed portion 162a is recessed toward the other side in the axial direction and is formed in an annular shape about the axial line. The recessed portion 162a accommodates the sealing material 17. The sealing material 17 is made of an elastic material such as rubber, and is formed in an annular shape about the axial line.

As shown in FIG. 4, the flange 162 includes three protruding portions 164. Each of the three protruding portions 164 protrudes toward the one side in the axial direction and is formed into a U shape surrounding the leg portions 151a, 151b, 151c. Each of the three protruding portions 164 defines the position of a corresponding leg portion of the leg portions 151a, 151b, and 151c.

As will be described later, the sealing material 17 forms a seal between the opening forming portion 100 of the blower casing 10 that forms the opening portion 10b and the bottom portion 162b of the recessed portion 162a of the flange 162. The sealing material 17 is in an elastically deformed state as will be described later. The annular protrusion portion 163 protrudes from one side of the housing main body 161 in the axial direction toward the one side in the axial direction and is formed in a cylindrical shape.

On the other side of the annular protrusion portion 163 in the axial direction, a claw portion 163a which protrudes radially outward is formed. In the present embodiment, one side of the annular protrusion portion 163 in the axial direction is fitted in the inner cylindrical portion 152, and in this state, the claw portion 163a is fitted into the throughhole 152b of the inner cylindrical portion 152. As a result, the claw portion 163a serves a role of fixing the bell mouth module 15 to the electric motor 16.

The inside/outside air switching box 2 includes a housing 200 and inside/outside air switching doors 201, 202. The housing 200 forms an outside air introduction port 203 and an inside air introduction port 204. The outside air introduction port 203 introduces outside air from outside of the passenger compartment into the housing 200 through an outside air introduction duct 210.

The inside air introduction port 204 introduces inside air into the housing 200 from inside the passenger compartment. The inside/outside air switching door 201 opens and closes the outside air introduction port 203. The inside/outside air switching door 202 opens and closes the inside air introduction port 204. The inside/outside air switching doors 201, 202 are driven to open or close by a servomotor. As a result, at least one of outside air from the outside air introduction port 203 and inside air from the inside air introduction port 204 can be introduced into the opening portion 10a of the blower casing 10. The element denoted by reference numeral 300 in FIG. 6 is a connector for connecting the electric motor 16 to an electronic control unit.

Next, the operation of the blower unit 1 of the present embodiment will be described with reference to FIG. 2 etc.

First, the electric motor 16 outputs a rotational force from the rotating shaft 16a to the centrifugal fans 11, 12. Accordingly, the centrifugal fans 11 and 12 are rotationally driven by the rotating shaft 16a to rotate.

At this time, as the centrifugal fan 11 rotates, the air blown out from the inside/outside air switching box 2 is sucked through the filter 10c. In this case, as a bell mouth portion, the forming portion 13b rectifies the air sucked in from the inside/outside air switching box 2 through the filter 10c and guides the air to the centrifugal fan 11.

Along with this, the centrifugal fan 11 blows air outward in the radial direction. The blown air is collected in the air passage 13c of the scroll casing 13 and blown out to the inside air conditioning unit 3.

Meanwhile, as the centrifugal fan 12 rotates, air is sucked in from the inside/outside air switching box 2 through the filter 10c and the air flow path 10d. At this time, the bell mouth portion 150 rectifies the air sucked in from the inside/outside air switching box 2 through the filter 10c and the air flow path 10d and guides the air to the centrifugal fan 12.

Along with this, the centrifugal fan 12 blows air outward in the radial direction of the axial line. The blown air is collected in the air passage 14c of the scroll casing 14 and blown out to the inside air conditioning unit 3.

The inside air conditioning unit 3 adjusts the temperature of the two layers of air blown out from the blower unit 1 in this manner and blows the air into the passenger compartment.

Figure 9:
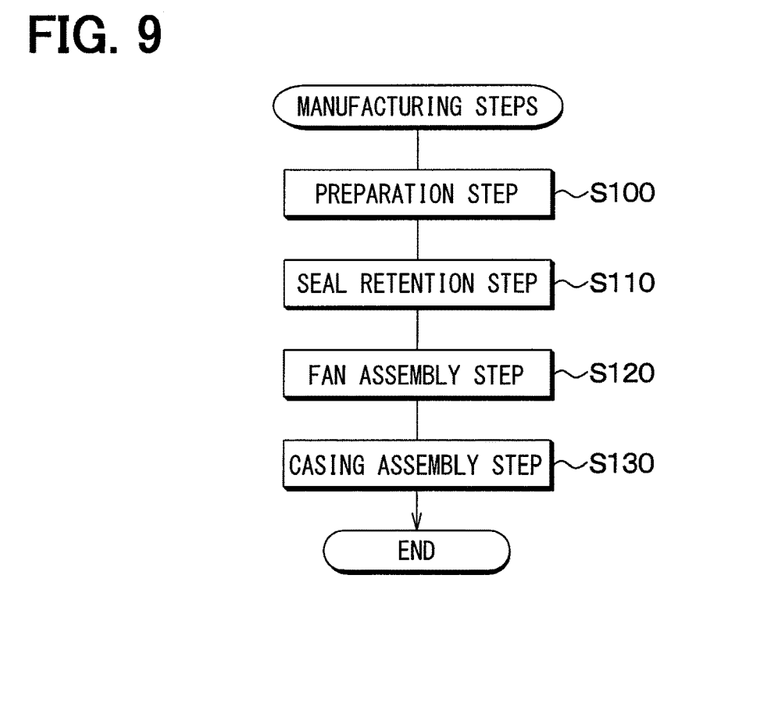
FIG. 9 is a flowchart showing a manufacturing process of a blower unit of FIG. 1.

Next, the assembly of the blower unit 1 of the present embodiment will be described with reference to FIG. 9. Hereinafter, the subject that performs this assembly is referred to as the performing subject. This performing subject may be a person or an assembling apparatus. Further, the performing subject may be a combination of a person in one setting and an assembling apparatus in another setting.

First, in step S100 which is an initial preparation step, the performing subject separately prepares the electric motor 16, the centrifugal fans 11, 12, the bell mouth module 15, and the sealing material 17. At this time, the performing subject prepares the blower casing 10 and the scroll casings 13, 14 in a state where the scroll casings 13, 14 are accommodated in the blower casing 10.

In the next step at step S110, the performing subject houses the sealing material 17 in the recessed portion 162a of the flange 162 of the electric motor 16.

In addition to this, the performing subject also inserts the annular protrusion portion 163 of the motor housing 160 of the electric motor 16 into the inner cylindrical portion 152 of the bell mouth module 15 from the other side in the axial direction. At this time, the claw portion 163a of the annular protrusion portion 163 of the motor housing 160 of the electric motor 16 fits into the throughhole 152b of the inner cylindrical portion 152 of the bell mouth module 15 as shown in FIG. 5.

As a result, the bell mouth module 15 is fixed to the motor housing 160 of the electric motor 16.

At this time, the sealing material 17 is interposed between the claw portions 155a, 155b, 155c of the bell mouth module 15 and the bottom portion 162b of the recessed portion 162a of the flange 162 of the electric motor 16. As a result of this, the sealing material 17 is retained by the claw portions 155a, 155b, 155c of the bell mouth module 15 and the bottom portion 162b of the recessed portion 162a of the flange 162 of the electric motor 16.

As a result, the bell mouth module 15, the electric motor 16, and the sealing material 17 are assembled into one unit.

In the next step at step S120, the performing subject arranges the centrifugal fans 11 and 12 on the lower side of the bell mouth module 15, the electric motor 16, and the sealing material 17 in the top-down direction. Along with this, the performing subject inserts the boss portion 121 of the centrifugal fans 11, 12 into the inner cylindrical portion 152 of the bell mouth module 15. As a result, the boss portion 121 of the centrifugal fans 11, 12 is connected to the rotation shaft 16a in the annular protrusion portion 163 of the motor housing 160.

In step 130, which is the next step, the performing subject assembles the bell mouth module 15, the electric motor 16, and the sealing material 17 with respect to the blower casing 10.

Specifically, the performing subject inserts the centrifugal fans 11, 12 into the scroll casings 13, 14, and closes the opening portion 10b of the blower casing 10 with the motor housing 160 of the electric motor 16. In addition to this, the performing subject also fixes the blower casing 10 to the motor housing 160 with a fastening member or the like.

At this time, the sealing material 17 is compressed by elastic deformation between the opening forming portion 100 of the blower casing 10 and the bottom portion 162b of the recessed portion 162a of the flange 162 of the electric motor 16.

As a result, the sealing material 17 is able to form a seal between the opening forming portion 100 of the blower casing 10 and the bottom portion 162b of the recessed portion 162a of the flange 162 of the electric motor 16.

The blower unit 1 configured as described above exhibits advantages when rainwater or the like enters the electric motor 16 side of the blower casing 10 from outside of the vehicle through the outside air introduction duct 210 and the inside/outside air switching box 2. Specifically, at this time, rainwater or the like is prevented from leaking into the passenger compartment through the gap between the opening forming portion 100 of the blower casing 10 and the bottom portion 162b of the recessed portion 162a of the electric motor 16.

Comparative Example

Next, a comparative example will be described in order to more clearly illustrate the advantages exhibited by the blower unit 1 of the above described embodiment.

Consider a blower unit of a comparative example which includes a blower case, first and second centrifugal fans, first and second scroll cases, and an electric motor. The comparative example blower unit is defined to have the below features.

On one axial side of the electric motor in the blower case, a first opening portion is provided, through which air flow is introduced from an inside/outside air switching introduction box. The first centrifugal fan is housed in the blower case and is disposed on one side of the electric motor in the axial direction. The first centrifugal fan is driven by the electric motor to rotate, thereby sucking in air from one side in the axial direction and blowing the air out radially outward.

The second centrifugal fan is housed in the blower case and is disposed between the first centrifugal fan and the electric motor. The second centrifugal fan is driven by the electric motor to rotate, thereby sucking in air from the other side in the axial direction and blowing the air out radially outward.

The blower case is provided with an opening forming portion that forms a second opening portion. The second opening portion opens toward the other side in the axial direction. The second opening is closed by the electric motor. The first and second scroll casings for housing the first and second centrifugal fans are housed in the blower case.

A first air suction portion and a first air flow path are formed in the first scroll casing. The first air suction port opens to one side in the axial direction and guides the air from the first opening portion to the first centrifugal fan. The first air flow path collects the air blown out from the first centrifugal fan and blows out the collected air.

A second air suction portion and a second air flow path are formed in the second scroll casing. The second air suction port opens to the other side in the axial direction and guides the air from the first opening portion to the second centrifugal fan. The second air flow path collects the air blown out from the second centrifugal fan and blows out the collected air.

In the above described comparative example blower unit, rainwater or the like may enter the inside of the blower case from outside the vehicle compartment through an outside air introduction hole of the inside/outside air switching introduction box. The blower case is disposed in the passenger compartment.

Here, the present inventor contemplated that, in order to prevent water from leaking from the interior of the blower case through a gap between the opening forming portion of the blower case and the electric motor into the vehicle interior, a sealing material may be provided between the opening forming portion of the blower case and the electric motor.

Typically, inside the blower case, first and second bell mouth portions are used for rectifying and guiding the air from the first opening portion to the first and second air intake ports.

The outer diameters of the first and second centrifugal fans are larger than the inner diameters of the opening portions of the first and second bell mouth portions. Therefore, by using first and second bell mouth portions which are integrally formed with the first and second scroll casings, it is not possible to insert the first and second centrifugal fans in the first and second scroll casings.

In view of this, it is contemplated that a member molded integrally with the first scroll casing may be used as the first bell mouth portion, and a member molded independently from the second scroll casing may be used as the second bell mouth portion.

Figure 10:
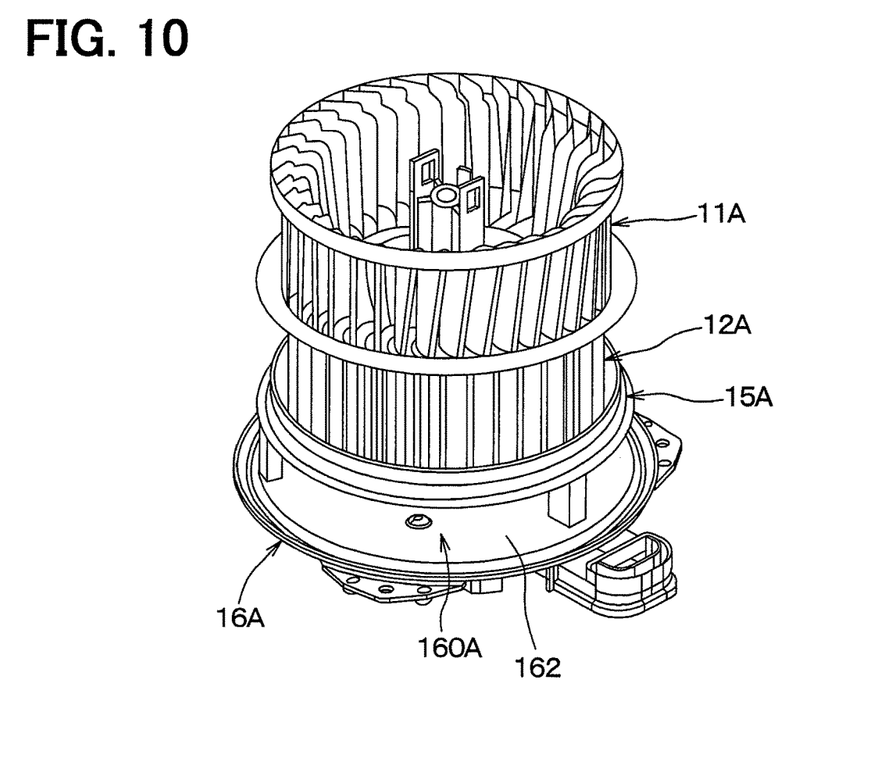
FIG. 10 is a perspective view showing an electric motor, a centrifugal fan, and a bell mouth module in a comparative example.
Figure 11:
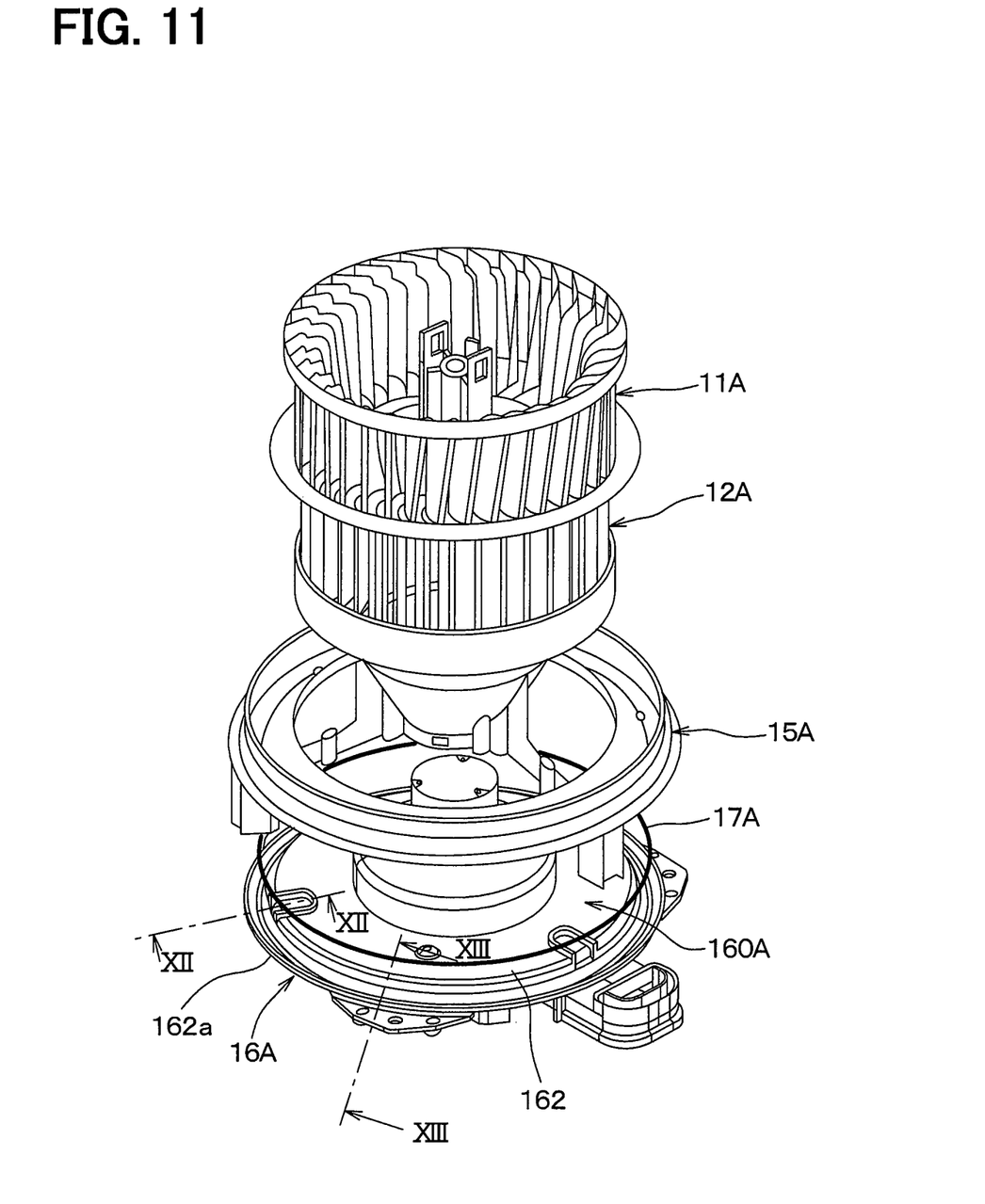
FIG. 11 is an exploded view showing an electric motor, a centrifugal fan, and a bell mouth module in a comparative example.

In this regard, as shown in FIG. 10 and FIG. 11 which illustrate another comparative example, the present inventor examined the possibility of assembling the first and second centrifugal fans 11A, 12A, the electric motor 16A, the second bell mouth portion 15A, and the sealing material 17A.

First, the second bell mouth portion 15A is fastened to the electric motor 16A, and the first and second centrifugal fans are arranged on the lower side of the electric motor 16A in the top-down direction. Then, the rotating shaft of the electric motor 16A is connected to the first and second centrifugal fans 11A, 12A, and the electric motor 16A, the first and second centrifugal fans 11A, 12A, and the second bell mouth portion 15A are assembled into a single unit. The integrated electric motor 16A, the first and second centrifugal fans 11A and 12A, and the second bell mouth portion 15A are assembled into the blower case.

At this time, in order to prevent the sealing material 17A from falling off from the electric motor 16A, it is also conceivable to fix the sealing material 17A to the electric motor 16A using a fixing member such as an adhesive. However, a process of fixing the sealing material 17A to the electric motor 16A is required, and the number of assembly steps is increased.

Figure 12:
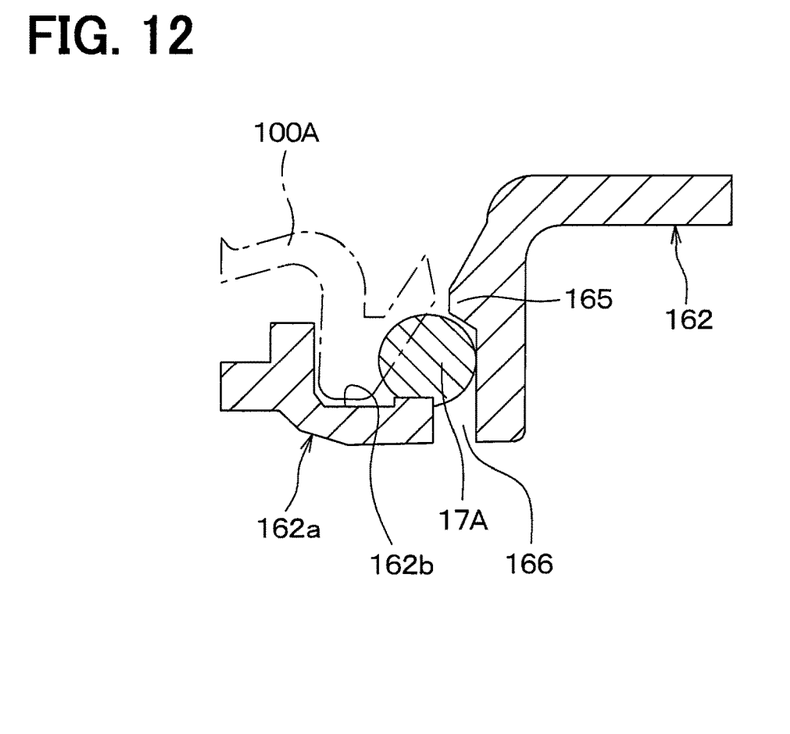
FIG. 12 is a sectional view taken along line XII-XII in FIG. 10.
Figure 13:
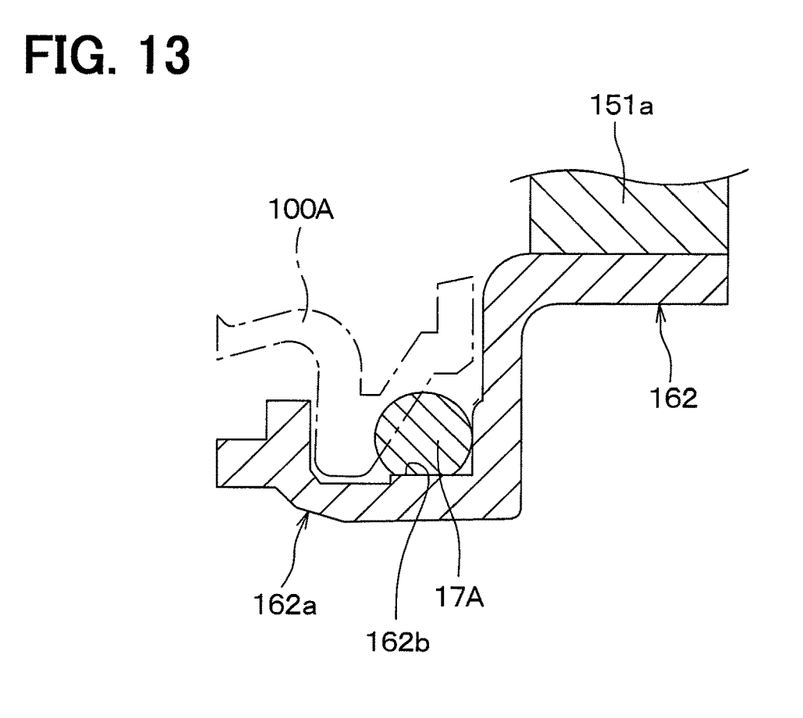
FIG. 13 is a sectional view taken along the line XIII-XIII in FIG. 10.

As shown in FIGS. 12 and 13, the flange 162 of the motor housing 160A of the electric motor 16A is provided with a recessed portion 162a for accommodating the sealing material 17A, and the side wall of the recessed portion 162a is provided with a claw portion 165 which protrudes radially outwardly. In this case, when connecting the rotating shaft of the electric motor 16A to the shaft holes of the first and second centrifugal fans 11A, 12A, the claw portion 165 can hold the sealing material 17A in the recessed portion 162a.

However, in order to make it possible to remove the molded product from a metal mold when injection molding the motor housing 160A including the claw portion 165, the structure of the metal mold itself becomes complicated. In addition, in the recessed portion 162a of the flange 162 of the electric motor 16A, it is necessary to provide a hole 166 in order to insert a mold for molding the claw portion 165—specifically, a lower mold.

Conversely, the manufacturing method of the blower unit 1 of the present embodiment includes the step of preparing the bell mouth module 15, the electric motor 16, and the sealing material 17. Further, in this manufacturing method, the sealing material 17 is interposed between the claw portions 155a to 155c of the bell mouth module 15 and the bottom portion 162b of the recessed portion 162a of the flange 162 of the electric motor 16, and the bell mouth module 15 is attached to the electric motor 16.

The manufacturing method of the blower unit 1 includes a step of connecting the centrifugal fan 11 and the centrifugal fan 12 to the rotating shaft 16a of the electric motor 16 in a state where the bell mouth module 15 is attached to the electric motor 16. Furthermore, this manufacturing method includes a step of attaching the electric motor 16 to the blower casing 10 in a particular state. In the particular state, the centrifugal fan 11 is housed in the scroll casing 13, the centrifugal fan 12 is housed in the scroll casing 14, and the opening portion 10b of the blower casing 10 is closed by the electric motor 16.

As a result, the rotating shaft 16a of the electric motor 16 may be coupled to the centrifugal fans 11, 12 in a state where the sealing material 17 is interposed between the claw portions 155a to 155c of the bell mouth module 15 and the bottom portion 162b of the recessed portion 162a of the flange 162 of the electric motor 16. At this time, it is not necessary to use an adhesive or the claw portion 165 of the flange 162 of the electric motor 16A shown in FIG. 11.

Due to the above, it is possible to provide the blower unit 1 with improved manufacturability and a blower unit 1 manufacturing method suitable for this blower unit 1.

In the present embodiment, the bell mouth module 15 has a structure in which the claw portions 155a to 155c are provided on the leg portions 151a to 151c. For this reason, unlike the flange 162 of the electric motor 16A in FIG. 11, there is no need to provide the claw portion 165 and the hole 166, so that metal molds with simple structures may be used.

In the present embodiment, since the hole 166 as shown in FIG. 12 is not provided in the flange 162 of the electric motor 16, water does not leak from the inside of the blower casing 10 to the passenger compartment through the hole 166.

In the present embodiment, the leg portions 151a to 151c and the claw portions 155a to 155c of the bell mouth module 15 are disposed so as to be out of contact with the motor housing 160 of the electric motor 16. For this reason, vibrations and noises of the electric motor 16 may be prevented from being transmitted to the vehicle interior through the bell mouth module 15, the centrifugal fans 11, 12, and the inside air conditioning unit 3.

In the present embodiment, the flange 162 of the motor housing 160 is provided with the recessed portion 162a that accommodates the sealing material 17. Therefore, the sealing material 17 may be easily retained by the motor housing 160 of the electric motor 16 and the bell mouth module 15.

OTHER EMBODIMENTS (1) In the above embodiment, an example is described in which the blower unit 1 is applied to a vehicle, but the blower unit 1 may be applied to things other than a vehicle (for example, stationary air conditioners).

(2) In the above embodiment, an example is described in which the opening portion 10a is provided on one side of the blower casing 10 in the axial direction. However, instead of this, it is also possible to provide an opening portion 10b in a portion of the blower casing 10 other than the one side in the axial direction.

(3) In the above embodiment, an example is described in which sirocco fans are used as the centrifugal fans 11, 12. However, a rearward fan (that is, a turbo fan) or a radial fan may be used instead.

(4) Further, the present disclosure is not limited to the above-described embodiments, and can be appropriately modified. Individual elements or features of a particular embodiment are generally not limited to that particular embodiment, but, where applicable, are interchangeable and can be used in a selected embodiment, even if not specifically shown or described. Individual elements or features of a particular embodiment are not necessarily essential unless it is specifically stated that the elements or the features are essential in the foregoing description, or unless the elements or the features are obviously essential in principle. A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. Furthermore, a material, a shape, a positional relationship, or the like, if specified in the above-described example embodiments, is not necessarily limited to the specific shape, positional relationship, or the like unless it is specifically stated that the material, shape, positional relationship, or the like is necessarily the specific material, shape, positional relationship, or the like, or unless the shape, positional relationship, or the like is obviously necessary to be the specific shape, positional relationship, or the like in principle.

CONCLUSION

According to a first aspect described in some or all of the above embodiments and other embodiments, in a method of manufacturing a blower unit that includes an electric motor that includes a rotating shaft which outputs a rotational force, a first centrifugal fan disposed on one side of the electric motor in an axial direction of the rotating shaft, the first centrifugal fan configured to be rotated by the rotational force of the rotating shaft to suck in air from the one side in the axial direction and blowing out the air outward in a radial direction centered about an axial line of the rotating shaft, a second centrifugal fan disposed between the first centrifugal fan and the electric motor, the second centrifugal fan configured to be rotated by the rotational force of the rotating shaft to suck in air from an other side in the axial direction and blowing out the air outward in the radial direction centered about the axial line of the rotating shaft, a blower casing that forms a first opening portion into which air flows, the blower casing including an opening forming portion that forms a second opening portion that opens toward the other side in the axial direction, a first scroll casing which is disposed inside the blower casing and which houses the first centrifugal fan, the first scroll casing forming a first air intake port that opens toward the one side in the axial direction and that guides the air from the first opening portion to the first centrifugal fan, the air blown out from the first centrifugal fan being blown out by the first scroll casing, a second scroll casing which is disposed inside the blower casing and which houses the second centrifugal fan, the second scroll casing forming a second air intake port that opens toward the other side in the axial direction, the air blown out from the second centrifugal fan being blown out by the second scroll casing, a sealing material that forms a seal between the opening forming portion of the blower casing and the electric motor, and a bell mouth module that includes a bell mouth portion which is disposed within the blower casing and which rectifies an air flow from the first opening portion and guides the air flow to the second centrifugal fan through the second air intake port, and a retaining portion that retains the sealing material, the manufacturing method includes preparing the bell mouth module, the electric motor, and the sealing material, interposing the sealing material between the retaining portion of the bell mouth module and the electric motor, and attaching the bell mouth module to the electric motor, connecting the first centrifugal fan and the second centrifugal fan to the rotating shaft of the electric motor while the bell mouth module is attached to the electric motor, and closing the second opening portion of the blower casing by: housing the first centrifugal fan in the first scroll casing, housing the second centrifugal fan in the second scroll casing, and attaching the electric motor to the blower casing.

According to a second aspect, a blower unit includes an electric motor that includes a rotating shaft which outputs a rotational force, a first centrifugal fan disposed on one side of the electric motor in an axial direction of the rotating shaft, the first centrifugal fan configured to be rotated by the rotational force of the rotating shaft to suck in air from the one side in the axial direction and blowing out the air outward in a radial direction centered about an axial line of the rotating shaft, a second centrifugal fan disposed between the first centrifugal fan and the electric motor, the second centrifugal fan configured to be rotated by the rotational force of the rotating shaft to suck in air from an other side in the axial direction and blowing out the air outward in the radial direction centered about the axial line, and a blower casing that forms a first opening portion into which air flows, the blower casing including an opening forming portion that forms a second opening portion that opens toward the other side in the axial direction, wherein the electric motor is disposed such that the second opening portion of the blower casing is closed by the electric motor, and the blower unit further includes a first scroll casing disposed inside the blower casing that houses the first centrifugal fan, the first scroll casing forming a first air intake port that opens toward the one side in the axial direction and that guides the air from the first opening portion to the first centrifugal fan, the air blown out from the first centrifugal fan being blown out by the first scroll casing, a second scroll casing disposed inside the blower casing that houses the second centrifugal fan, the second scroll casing forming a second air intake port that opens toward the other side in the axial direction, the air blown out from the second centrifugal fan being blown out by the second scroll casing, a sealing material disposed between the opening forming portion of the blower casing and the electric motor to form a seal between the opening forming portion and the electric motor, and a bell mouth module disposed within the blower casing and supported by the electric motor, the bell mouth module including a bell mouth portion which rectifies an air flow from the first opening portion and guides the air flow to the second centrifugal fan through the second air intake port, wherein the bell mouth module includes a retaining portion that, together with the electric motor, retains the sealing material by interposing the sealing material between the bell mouth module and the electric motor.

According to a third aspect, the electric motor forms a recessed portion that is recessed toward the other side in the axial direction and accommodates the sealing material.

Due to this, the sealing material can be easily retained.

According to a fourth aspect, the bell mouth module is disposed such that the retaining portion of the bell mouth module is not in contact with the electric motor.

This makes it possible to suppress the transmission of vibrations and noises from the electric motor to the bell mouth module.

The invention claimed is:

1. A method of manufacturing a blower unit that includes:
   an electric motor that includes a rotating shaft which outputs a rotational force;
   a first centrifugal fan disposed on one side of the electric motor in an axial direction of the rotating shaft, the first centrifugal fan configured to be rotated by the rotational force of the rotating shaft to suck in air from the one side in the axial direction and blowing out the air outward in a radial direction centered about an axial line of the rotating shaft;
   a second centrifugal fan disposed between the first centrifugal fan and the electric motor, the second centrifugal fan configured to be rotated by the rotational force of the rotating shaft to suck in air from an other side in the axial direction and blowing out the air outward in the radial direction centered about the axial line;
   a blower casing that forms a first opening portion into which air flows, the blower casing including an opening forming portion that forms a second opening portion that opens toward the other side in the axial direction;
   a first scroll casing which is disposed inside the blower casing and which houses the first centrifugal fan, the first scroll casing forming a first air intake port that opens toward the one side in the axial direction and that guides the air from the first opening portion to the first centrifugal fan, the air blown out from the first centrifugal fan being blown out by the first scroll casing;
   a second scroll casing which is disposed inside the blower casing and which houses the second centrifugal fan, the second scroll casing forming a second air intake port that opens toward the other side in the axial direction, the air blown out from the second centrifugal fan being blown out by the second scroll casing;
   a sealing material that forms a seal between the opening forming portion of the blower casing and the electric motor; and
   a bell mouth module that includes a bell mouth shaped opening portion which is disposed within the blower casing and which rectifies an air flow from the first opening portion and guides the air flow to the second centrifugal fan through the second air intake port, and a retaining portion that retains the sealing material, the bell mouth shaped opening portion being formed to face toward the electric motor, the bell mouth shaped opening portion being directly connected to the second scroll casing to surround the second air intake port of the second scroll casing, and the bell mouth shaped opening portion being formed such that a diameter dimension of the second air intake port gradually increases toward the other side in the axial direction, the manufacturing method comprising:
preparing the bell mouth module, the electric motor, and the sealing material;
interposing the sealing material between the retaining portion of the bell mouth module and the electric motor, and attaching the bell mouth module to the electric motor;
connecting the first centrifugal fan and the second centrifugal fan to the rotating shaft of the electric motor while the bell mouth module is attached to the electric motor; and
closing the second opening portion of the blower casing by: housing the first centrifugal fan in the first scroll casing, housing the second centrifugal fan in the second scroll casing, and attaching the electric motor to the blower casing, wherein
the electric motor is formed with a recessed portion that is recessed toward the other side in the axial direction, the recessed portion accommodating the sealing material.

2. The method of manufacturing the blower unit according to claim 1, wherein the bell mouth shaped opening portion is in close proximity with the second centrifugal fan.

3. The method of manufacturing the blower unit according to claim 1, wherein the bell mouth shaped module further includes a conical portion having a conical shape with a diameter that increases toward the one side in the axial direction.

4. A blower unit, comprising:
an electric motor that includes a rotating shaft which outputs a rotational force;
a first centrifugal fan disposed on one side of the electric motor in an axial direction of the rotating shaft, the first centrifugal fan configured to be rotated by the rotational force of the rotating shaft to suck in air from the one side in the axial direction and blowing out the air outward in a radial direction centered about an axial line of the rotating shaft;
a second centrifugal fan disposed between the first centrifugal fan and the electric motor, the second centrifugal fan configured to be rotated by the rotational force of the rotating shaft to suck in air from an other side in the axial direction and blowing out the air outward in the radial direction centered about the axial line; and
a blower casing that forms a first opening portion into which air flows, the blower casing including an opening forming portion that forms a second opening portion that opens toward the other side in the axial direction, wherein
the electric motor is disposed such that the second opening portion of the blower casing is closed by the electric motor, and
the blower unit further comprises:
a first scroll casing disposed inside the blower casing that houses the first centrifugal fan, the first scroll casing forming a first air intake port that opens toward the one side in the axial direction and that guides the air from the first opening portion to the first centrifugal fan, the air blown out from the first centrifugal fan being blown out by the first scroll casing;
a second scroll casing disposed inside the blower casing that houses the second centrifugal fan, the second scroll casing forming a second air intake port that opens toward the other side in the axial direction, the air blown out from the second centrifugal fan being blown out by the second scroll casing;
a sealing material disposed between the opening forming portion of the blower casing and the electric motor to form a seal between the opening forming portion and the electric motor; and
a bell mouth module disposed within the blower casing and supported by the electric motor, the bell mouth module including a bell mouth shaped opening portion which rectifies an air flow from the first opening portion and guides the air flow to the second centrifugal fan through the second air intake port, the bell mouth shaped opening portion being formed to face toward the electric motor, wherein
the bell mouth module includes a retaining portion that, together with the electric motor, retains the sealing material by interposing the sealing material between the bell mouth module and the electric motor,
the bell mouth shaped opening portion of the bell mouth module is directly connected to the second scroll casing to surround the second air intake port of the second scroll casing,
the bell mouth shaped opening portion is formed such that a diameter dimension of the second air intake port increases toward the other side in the axial direction, and
the electric motor is formed with a recessed portion that is recessed toward the other side in the axial direction, the recessed portion accommodating the sealing material.

5. The blower unit according to claim 4, wherein the bell mouth module is disposed such that the retaining portion of the bell mouth module is not in contact with the electric motor.

6. The blower unit according to claim 4, wherein the bell mouth shaped opening portion is in close proximity with the second centrifugal fan.

7. The blower unit according to claim 4, wherein the bell mouth module further includes a conical portion having a conical shape with a diameter that increases toward the one side in the axial direction.

8. A blower unit, comprising:
an electric motor that includes a rotating shaft which outputs a rotational force;
a first centrifugal fan disposed on one side of the electric motor in an axial direction of the rotating shaft, the first centrifugal fan configured to be rotated by the rotational force of the rotating shaft to suck in air from the one side in the axial direction and blowing out the air outward in a radial direction centered about an axial line of the rotating shaft;
a second centrifugal fan disposed between the first centrifugal fan and the electric motor, the second centrifugal fan configured to be rotated by the rotational force of the rotating shaft to suck in air from an other side in the axial direction and blowing out the air outward in the radial direction centered about the axial line; and
a blower casing that forms a first opening portion into which air flows, the blower casing including an opening forming portion that forms a second opening portion that opens toward the other side in the axial direction, wherein
the electric motor is disposed such that the second opening portion of the blower casing is closed by the electric motor, and the blower unit further comprises:

a first scroll casing disposed inside the blower casing that houses the first centrifugal fan, the first scroll casing forming a first air intake port that opens toward the one side in the axial direction and that guides the air from the first opening portion to the first centrifugal fan, the air blown out from the first centrifugal fan being blown out by the first scroll casing;

a second scroll casing disposed inside the blower casing that houses the second centrifugal fan, the second scroll casing forming a second air intake port that opens toward the other side in the axial direction, the air blown out from the second centrifugal fan being blown out by the second scroll casing;

a sealing material disposed between the opening forming portion of the blower casing and the electric motor to form a seal between the opening forming portion and the electric motor; and a bell mouth module disposed within the blower casing and supported by the electric motor, the bell mouth module including a bell mouth shaped opening portion which rectifies an air flow from the first opening portion and guides the air flow to the second centrifugal fan through the second air intake port, the bell mouth shaped opening portion being formed to face toward the electric motor, wherein the bell mouth module includes a retaining leg and a claw that protrudes from the retaining leg, the retaining leg and the claw, together with the electric motor, retain the sealing material by interposing the sealing material between the bell mouth module and the electric motor, the bell mouth shaped opening portion of the bell mouth module is directly connected to the second scroll casing to surround the second air intake port of the second scroll casing, the bell mouth shaped opening portion is formed such that a diameter dimension of the second air intake port gradually increases toward the other side in the axial direction, the electric motor is formed with a recessed portion that is recessed toward the other side in the axial direction, the recessed portion accommodating the sealing material.

9. The blower unit according to claim 8, wherein the bell mouth shaped opening portion is in close proximity with the second centrifugal fan.

10. The blower unit according to claim 8, wherein the bell mouth module further includes a conical portion having a conical shape with a diameter that increases toward the one side in the axial direction.

* * * * *